May 4, 1965 E. B. BOYLAN ETAL 3,181,888
AUTOMATIC COUPLING MECHANISM FOR TRACTOR-TRAILER VEHICLES
Filed Sept. 25, 1961 3 Sheets-Sheet 2

INVENTORS:
EDWARD B. BOYLAN
HERMAN J. WHITE
BERNARD P. BOYLAN
GEORGE J. PYRE

BY
ATT'Y

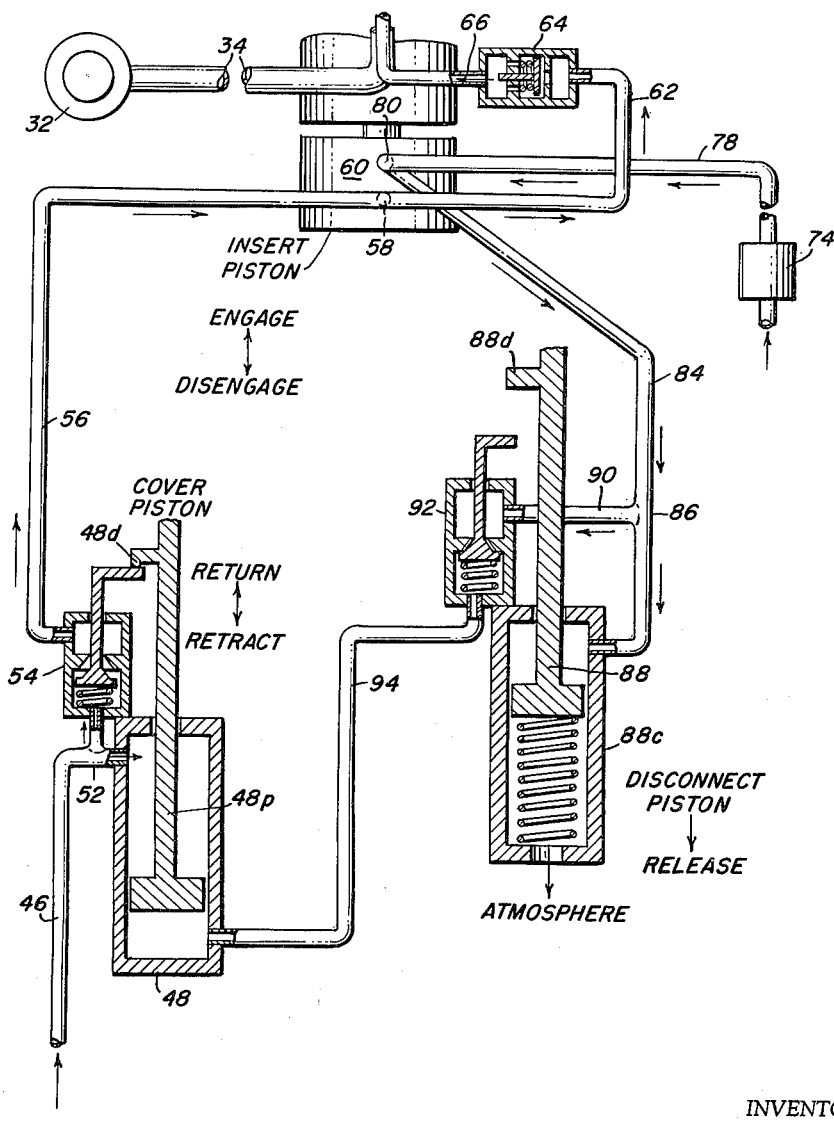

United States Patent Office 3,181,888
Patented May 4, 1965

3,181,888
AUTOMATIC COUPLING MECHANISM FOR
TRACTOR-TRAILER VEHICLES
Edward B. Boylan and Herman J. White, Chicago, Bernard P. Boylan, Hillside, and George J. Pyre, Chicago, Ill., assignors to Peer Cartage Co., Inc., Chicago, Ill., a corporation of Illinois
Filed Sept. 25, 1961, Ser. No. 140,536
13 Claims. (Cl. 280—421)

This invention relates in general to a connection between a tractor-trailer vehicle combination and more particularly to an improved mechanism for connecting and disconnecting the service lines between the tractor and trailer automatically as the tractor is coupled or uncoupled from the trailer.

In the ordinary tractor-trailer vehicle combination, brakes and electrical accessories on the trailer are usually controlled by air pressure and electrical power supplied from the tractor through manually connected lines. There are normally three lines leading from the tractor to the trailer, one being the electrical service line and the other two being the air supply and brake lines for control of the trailer brakes.

These service lines are usually in the form of a flexible rubber hose and are connected to mating lines secured to the trailer. In the conventional hookup, it is necessary for the operator or an assistant to get out of the cab and attach or detach the lines by hand, resulting in the loss of time, possible improper connection, plus the inconvenience the operator will endure during inclement weather. Also, the lines are long and are in an outward or exposed position between the tractor-trailer where they may be frequently subjected to snagging or severance.

Several recent developments have to some degree, eliminated the necessity of the long swinging service lines between the tractor and trailer by providing a contact to pass through a fifth wheel, mounted on the tractor, and a kingpin, mounted on the trailer. These devices still have many shortcomings, not only in the mechanism for coupling of the service lines through the kingpin and the fifth wheel, but the service systems do not provide safety features needed to protect others as well as the system itself. There has been too much reliance placed on the operator's discretion to insure proper sequence of operation in joining of the tractor with the trailer or disconnecting the tractor from the trailer. Further, the prior devices of this nature have not been able to positively permit the passage of the air pressure to the trailer brake, the trailer reservoir and to maintain constant electrical contact as the kingpin pivots in the fifth wheel as the trailer varies its position angularly with the tractor.

It is therefore the primary object of this invention to eliminate the problems and shortcomings of the prior art and to provide an improved mechanism to automatically connect and disconnect the service lines between the tractor-trailer vehicle combination.

A specific object of this invention is to provide an improved automatic mechanism for connecting and disconnecting the service lines between a trailer and a tractor.

Another object of this invention is to provide an improved, completely automatic, coupling mechanism for connecting or disconnecting the service lines between a tractor-trailer vehicle combination which is completely controlled from within the tractor cab.

A still further object of this invention is to provide an improved coupling mechanism for a tractor-trailer vehicle combination which is automatic in controlled sequence eleminating any possibility of disconnecting the tractor from the trailer prior to preparing the trailer for permanent location or for pulling the trailer prior to preparing the trailer for movement.

A still further specific object of this invention is to provide an improved kingpin on a trailer for mating engagement with an insert member in juxtaposition with a fifth wheel on a tractor wherein the power service lines are automatically connected.

Another object of this invention is to provide an improved automatic coupling mechanism for connecting and disconnecting the service lines in conjunction with the connecting and disconnecting of the tractor with the trailer, whereby the operator from within the tractor cab initiates the connection which is accomplished in a predetermined sequence.

Another object of this invention is to provide an improved connector insert mechanism mounted on a tractor which is coordinate with a fifth wheel to be positioned against a lower mating surface of a kingpin on a trailer.

Another object of this invention is to provide an improved coupling mechanism for automatically joining a tractor with a trailer which provides a positive connection of the electrical and fluid pressure service lines of the tractor with the trailer regardless of the varying angular relationship of the tractor with the trailer during operation.

Another object of this invention is to provide an improved automatic coupling mechanism for connecting and disconnecting the service lines between a tractor-trailer vehicle combination in conjunction with the connecting and disconnecting of the tractor with the trailer, that is readily adaptable to existing equipment on today's tractors and trailers, inexpensive to manufacture, assemble and install, provides easy maintenance because of the unique arrangement and compactness of component parts and permits ready use of the existing conventional service lines if a tractor, equipped with the connector of this invention, should be used with a trailer not equipped with the mating component kingpin of this invention.

With these objects and other features and advantages of the invention in mind, which will appear from the following description and claims in conjunction with the drawings, the invention consists in the novel construction, arrangement and the formation of the parts wherein:

FIG. 3 is a partial diagrammatical enlarged view of the elements shown in the center of FIG. 1.

By way of generalization, the invention provides an improved coupling mechanism for connection and disconnecting of a tractor with a trailer which serves as a means to automatically connect the service lines at the same time. The automatic coupling mechanism of this invention provides a variation in the internal structure of the conventional kingpin to provide passage therethrough for the air service and electrical conduits which connects with a reciprocable insert member carrying the fluid service and electrical lines from the tractor.

From the following description and procedure of operation it will be readily understood that this system is completely automatic and operable from within the tractor cab and that a positive interlock of the trailer to the tractor as well as the service lines is simultaneously performed.

This invention is a continuation-in-part of our now pending application Serial No. 49,781, filed August 15, 1960, for a Service System and Coupling Mechanism for Tractor-Trailer Vehicles, which is expressly incorporated herein by reference.

Figure 1:
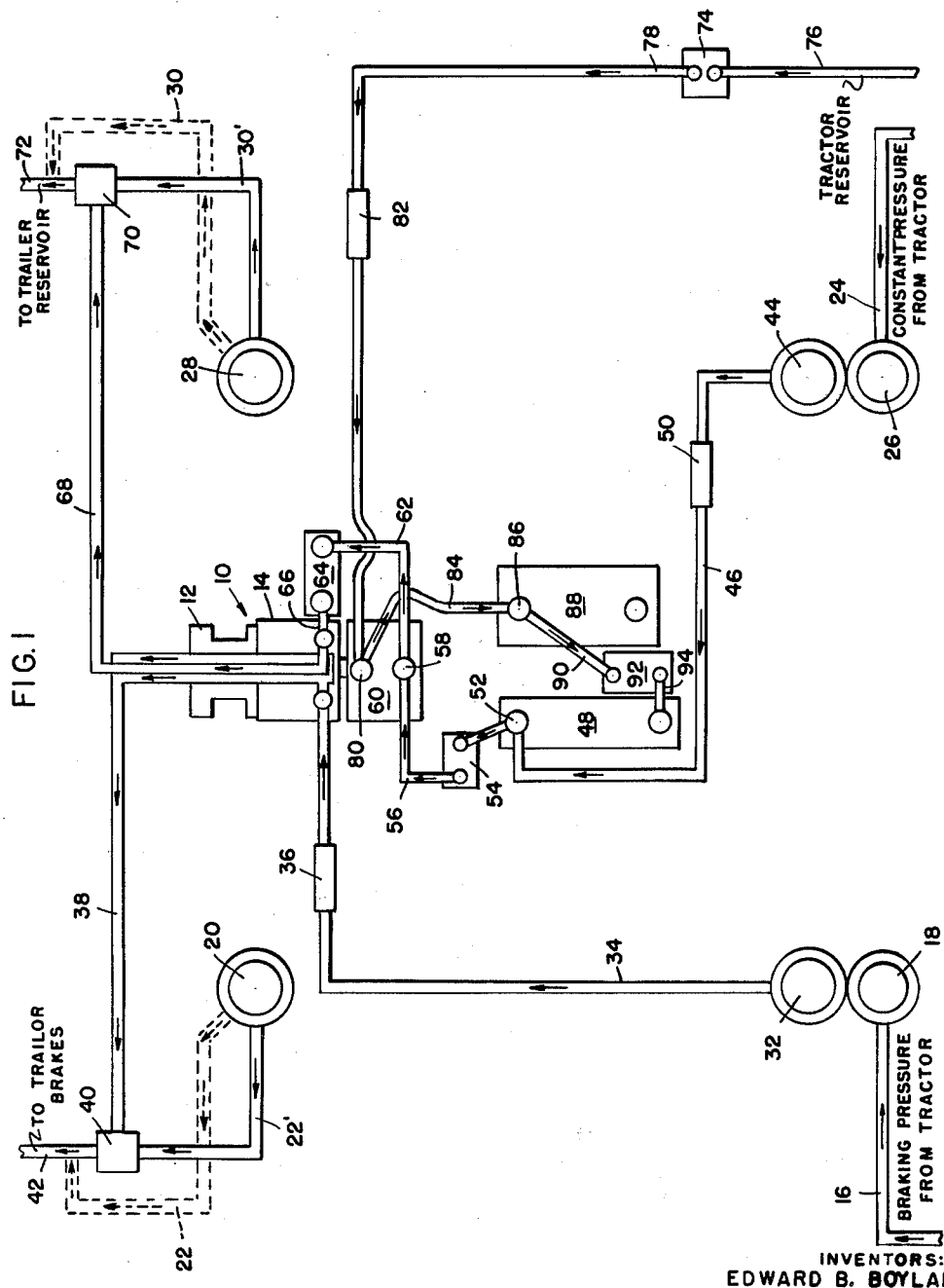
FIG. 1 is a fragmentary pictorial schematic view of the interconnecting fluid system of this invention.

Referring now to the drawings, specifically FIG. 1, the fluid pressure service system and control devices for actuation of the automatic coupling mechanism of this invention is illustrated with the existing conventional service lines shown by dashed lines.

The coupling mechanism of this invention is indicated generally by the numeral 10 and provides a kingpin 12, secured to the trailer, and a mating insert member 14 retained in juxtaposition with a conventional fifth wheel of a tractor for mating engagement with the under surface of the kingpin 12 when the kingpin is securely positioned within the fifth wheel. The kingpin 12 has the identical external configuration as existing conventional kingpins with only the internal portion and the under or lower surface being varied. In like manner, the fifth wheel, secured to the tractor, is also of conventional configuration with no physical changes required, thus making complete interchangeability between tractors and trailers whether the automatic coupling mechanism of this invention has been installed or not.

Installation of the coupling mechanism of this invention into the existing service lines is easily accomplished and involves little change as shown in FIG. 1, wherein a pressure line 16, extending from a conventional tractor brake system, terminates in a connector 18. A mating connector 20, mounted on the trailer, provides a line 22 (shown by dashed lines) directly connected with the trailer brakes. Thus the conventional tractor-trailer vehicle brake system hook up is accomplished by coupling normally joining connector 18 with connector 20.

A second fluid service line connection on a conventional tractor-trailer vehicle is from a constant pressure source on the tractor to a reservoir on the trailer. A line 24, connected to the pressure source, provides a connector 26 at the other end. A mating connector 28 is disposed on one end of a line 30 (shown by dashed lines) with the other end connected to the trailer reservoir. This interconnected fluid service line serves as the emergency braking system and the connection of the separate lines is accomplished in the same manner as the brake service lines, that is, by joining connector 26 to 28.

The third service line on a conventional tractor-trailer vehicle hook-up system carries the electrical power from the tractor to the trailer (not shown in the drawings) which is accomplished in exactly the same manner by connecting two electrical connections, one on the trailer and one on the tractor, together.

Referring again to the brake service line portion of the tractor-trailer vehicle system, a connector 32 is provided on the tractor to connect with the connector 18 having the line 16 attached thereto leading to the tractor pneumatic brake conduit. The connection of connector 32 with connector 18 is preferred instead of the connector 20 as previously explained. A pressure line 34 extends to the insert member 14 on the tractor with a suitable quick disconnect 36 disposed therebetween. A pressure line 38 extends from the upper portion of the kingpin 12 on the trailer to a double check valve 40 which has an outlet line 42 thereon extending to the trailer brakes. The line 22 that extends from the connector 20 which joins the trailer brakes in the conventional service system may now be joined to the double check 40 as indicated by the line 22'. It is readily understood that the conventional system is operable in exactly the same manner as before except the flow of pressure now passes through the double check valve 40. Flow passages, as will be explained in detail later, are formed through the connector member 14 and the kingpin 12 so that, when they are in the coupled position, the fluid to the tractor brakes will pass through line 16, connectors 18 and 32, line 34, quick disconnect 36, insert member 14, kingpin 12, line 38, check valve 40 and line 42 to the trailer brakes.

Still referring to FIG. 1, the second fluid service line for the coupling mechanism of this invention, normally used for an emergency system and conventionally connected by connectors 26 and 28, provides a plurality of control devices therein to effect automatic operation of the coupling device, yet provides a flow passage from the tractor to the trailer for replenishing air stored in the trailer for an emergency braking system.

A mating connector 44 is mounted on the tractor to connect with the connector 26. A pressure line 46 connects the connector 44 with a cover plate piston 48. A suitable quick disconnect 50, similar to the quick disconnect 36, is disposed in the line 46 to permit ready removal of the insert member 14 and operating devices for maintenance.

The cover piston 48 is directly connected to a cover plate 49 which is positioned over the upper exposed surface of the insert member 14 when it is not matingly connected to the kingpin 12 to prevent contamination of mating pressure seals and electrical contacts, to be explained. As shown in FIG. 1, immediately upon connection the fluid flow from the line 46 enters at the top end of the cover piston device 48 and effects a retracting movement of the piston element 48p to remove the cover plate from the protective position over the connector member 14.

To do this, the pressure line 46 is connected to a T-member 52, mounted on the piston 48, permitting the flow of fluid to the piston and also directly to a normally closed control valve 54. The control valve 54, being mechanically linked to the cover piston 48p by dog 48d, will not be actuated to its open position until the cover piston has moved to its extreme open position removing the cover plate from over the connector member 14. Upon actuation of the control valve 54, fluid will pass therethrough and out a pressure line 56 connected to a T-member 58 mounted on the lower end of an insert piston 60. The piston 60 is connected directly to the lower portion of the insert member 14 to effect reciprocation thereof for engagement and disengagement with the kingpin 12. The fluid entering the piston 60 through member 58 will cause the piston 60 to raise the insert member 14 into mating contact with kingpin 12.

Extending from the other side of T-member 58 is a pressure line 62 which connects to a delay control or pressure opened normally closed valve 64, the outlet of which is connected to the insert member 14 by a pressure line 66. Valve 64 delays the flow of fluid to the insert member until the insert piston 60 has raised the insert member 14 into pressure secured sealing relationship with the kingpin 12. Pressure build up after the piston has reached its upper limit of movement pops the valves 64 and air passes to the trailer air reservoir.

Flow passages, provided through the kingpin 12 and insert member 14, as will be explained in detail later, are connected to a pressure line 68 having a double check valve 70 secured at the other terminal. Outlet of the valve 70 has a pressure line 72 which extends to the trailer reservoir (not shown). The line 30 (shown in dashed lines) of the conventional emergency system may now be connected to the other part of the valve 70, as shown by the line 30'. As previously explained for the brake service line, the conventional emergency service line may be connected and utilized in exactly the same manner as before if desired, except the fluid flow will now pass through the valve 70.

An operating valve 74 is mounted in the cab portion of the tractor for manual actuation by a driver. An inlet line 76 interconnects the valve 74 with the reservoir (not shown) on the tractor. An outlet line 78 extends from the valve 74 to a T-member 80 mounted on the upper end of the piston 60 at the opposite end thereof as the T-member 58 previously described. A suitable quick disconnect 82 is disposed in the line 78 between the valve 74 and piston 60 for easy removal of the coupling insert 14 of this invention as previously explained for quick disconnects 36 and 50. Fluid flow from line 78 into piston 60 will move the piston therein downwardly and force the connector member 14 downwardly disconnecting it from the kingpin 12.

A line 84 extends from the other side of the T-member 80 to a T-member 86 mounted on one end of a pin released piston 88. Piston 88 retracts the normally closed conventional spring loaded latch-like pin on the fifth wheel engaging the kingpin to permit release of the kingpin 12.

The line 90 extends from the other side of T-member 86 and joins a control valve 92 which is in turn connected to the cover piston 48 by a pressure line 94. The valve 92 is mechanically coordinated with the piston 88 for engagement by the dog 88d on the piston whereby the fluid flow does not pass therethrough until the piston 88 has moved to the extreme latch releasing position which retracts the spring loaded holding pin to permit release of the kingpin from the fifth wheel. Thereupon the fluid passing through valve 92 into the piston 48 will return the cover plate 49 back over the connector member 14 which is now fully disengaged from the kingpin 12.

The above description has been directed primarily to the interconnection of the coupling mechanism and related fluid system of this invention relative to the existing fluid system on today's conventional tractor-trailer vehicle. The remaining service line, for electrical components on the trailer, is also automatically connected through the coupling mechanism of this invention as will be readily understood from the detailed structural description of the mating components of the coupling mechanism to follow.

Figure 2:
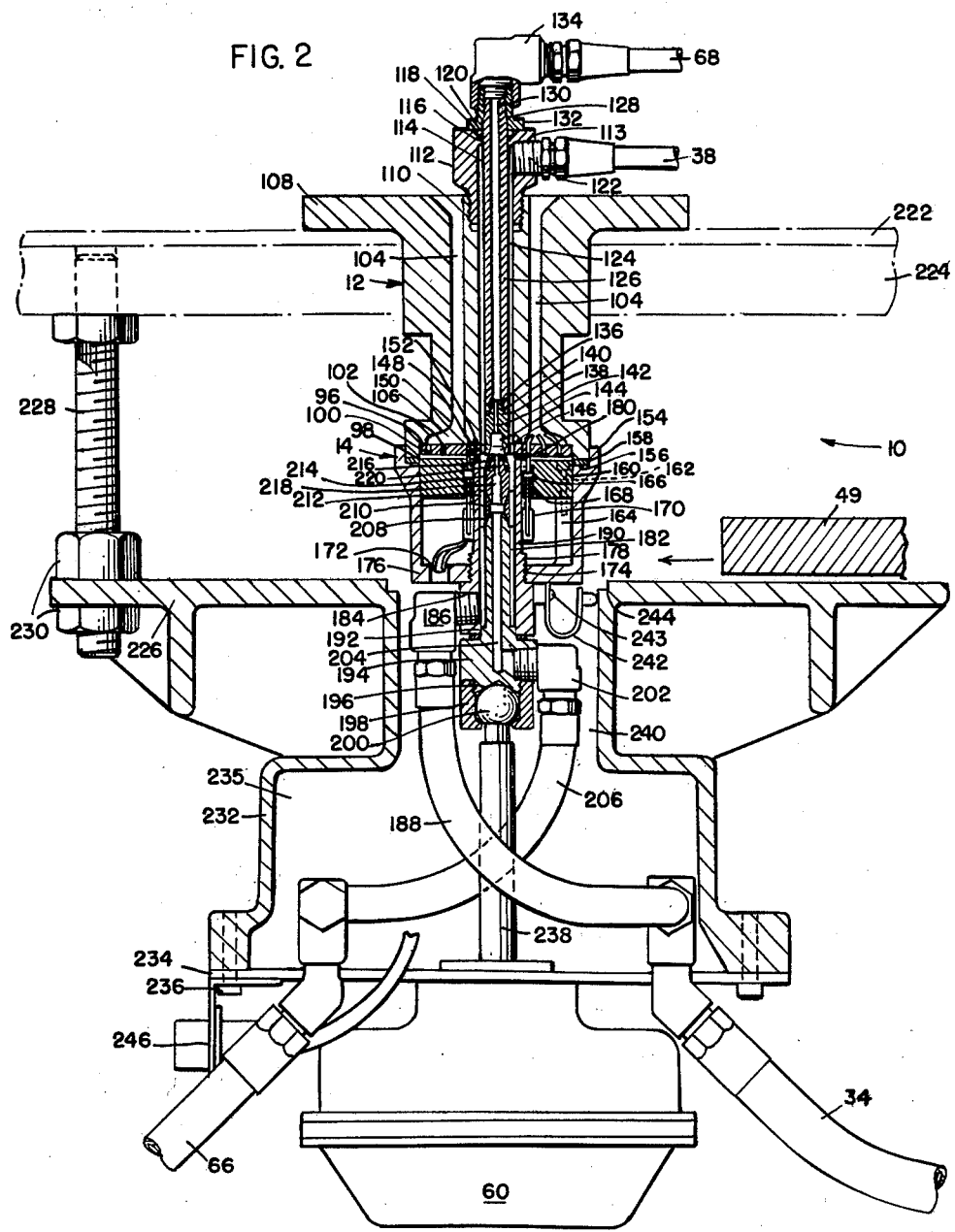
FIG. 2 is a fragmentary partially sectioned view of the automatic coupling mechanism of this invention.

Referring now to FIG. 2, the kingpin 12 has a centrally formed recess area 96 formed in the lower or under surface 98 thereof for receipt of a collector ring housing 100. The collector ring housing 100 is formed from any suitable stiff dielectric material, preferably nylon, and provides a plurality of concentrically spaced openings in which electrical contact rings 102 are securely mounted. Electrical lead wires are secured to the upper portion of the rings 102 and extend upwardly through passages 104, formed in the kingpin, to permit interconnection of the lead wires with the existing trailer wiring harness. The lower or under surface 98 of the kingpin in addition to the centrally disposed recess 96 for receipt of the collector ring housing 100, provides an additional cavity 106 formed above the recessed area 96 to provide space and to permit flexing of the lead wires.

Centrally mounted in the upper surface 108 of the kingpin 12 is a threaded aperture 110 which threadably receives a coupling member 112. The coupling member 112 provides two outlet taps for receipt of the brake pressure line 38 leading to the trailer brakes and the pressure line 68 leading to the trailer reservoir. The coupling member 112 provides a large central opening 114 passing through the longitudinal axis thereof which reduces in diameter adjacent the upper or top surface of the coupling 112, as indicated by the numeral 116. A recessed area 118 is formed in the upper surface 108 of the coupling member 112 adjacent the passage 114 for receipt of a sealing ring 120, preferably formed from a resilient material such as rubber. The coupling member 112 provides a threaded aperture 113 in the side thereof for receipt of a standard nipple member 122 which interconnects the large central opening 114 in the coupling member 112 with the pressure line 38. A flow passage 124, interconnecting the threaded aperture 110 with the lower or under surface 98 of the kingpin, is concentrically formed, relative to the threaded aperture 110, in the kingpin through the longitudinal axis thereof. Flow passage 124, extending through the kingpin, has an inside diameter corresponding to the inside diameter of the central opening 114 in the coupling member 112. An elongated pipe member 126, having an outside diameter substantially the same as the reduced diameter of the opening 114, as illustrated by the numeral 116, in the connector member 112, extends downwardly through the coupling member 112 and is concentrically held in the aperture 124. An upper end 128 of the elongated pipe member 126 extends through the coupling member 112 in sealing relationship with the sealing ring 120 and provides a threaded portion 130 for threading engagement with a connector nut 132. The connector nut 132 provides external threads for receipt of a connector member 134 which permits the connection of the pressure line 68 leading to the check valve 70 and the trailer reservoir. The other end of the pipe member 126 provides an internally threaded end portion 136 for receipt of a T-shaped element 138. The element 138 having a threaded end 140 engaging the end 136 of the pipe 126, provides an opening 142 therethrough which connects an enlarged opening 144, centrally formed in the lower surface 150 thereof, with the passage through the pipe member 126. Side walls 146 of the enlarged opening 144 flare outwardly to receive in sealing relationship a conical seal member, to be explained, secured on the insert member 14. A plurality of openings 148 are formed in the lower surface 150 of the element 138 adjacent the periphery thereof to provide an interconnecting passage with the enlarged aperture 114 which permits flow of the fluid from the insert member 14, as will be explained, up to the connector nipple 122 and line 38. The fluid flows to line 68 through the opening 142 in the member 138 and up through the pipe member 126 which connects to the nipple element 134. Thus, it is seen that two separate fluid flow passages are provided centrally through the kingpin with the electrical lines passing through centrally off set, spaced apart, passages separate from the fluid flow passages. A seal ring 152 is secured in the under surface of the cavity 96 to seat against the lower surface 150 of the element 138 to prevent leakage of fluid into the cavity 106 which is vented to atmosphere by the electrical line passages 104.

The insert member 14 provides a housing 154 which has a shoulder 156 formed in the internal surface thereof for receipt of the lower portion of the kingpin 12. A sealing member 158, preferably formed from a resilient material, such as neoprene rubber, is disposed on the shoulder 156 within the housing 154 and seals in mating relationship against the undersurface 98 of the kingpin when the insert member is matingly engaged therewith. The housing 154, being substantially a hollow cylinder, receives a dielectric block 160 in the upper portion thereof, which is secured to the housing 154 by a plurality of bolt members 162 which are threadably engaged in rib members 164 integrally formed on the inside wall of the housing 154.

The block 160, preferably formed from nylon, is positioned within the housing 154 so that the upper edge thereof will provide a channel for holding the sealing member 158 in position and to provide a spaced mating parallel surface for the collector ring housing 100 disposed in the kingpin 12. A plurality of metallic contacts 166 are resiliently mounted in the dielectric block 160 in juxtaposition for contact with the rings 102 in the collector ring housing 100 and are continually urged in the upwardly or contacting position by compression springs 168. The other ends of the contacts 166 are received in an electrical connector 170 which are connected to lead wires extending outwardly therefrom to connect with the tractor wiring harness. The lead wires pass through the insert member housing 154 through an aperture in a lower surface thereof as indicated by the numeral 172. A threaded aperture 174 is concentrically formed through a lower wall 176 of the housing 154 for receipt of a pipe member 178 having a threaded portion adjacent the lower end thereof for engagement with the threaded aperture 174. The upper end of pipe member 178 passes through the dielectric block 160 and provides a groove in the end surface thereof for receipt of a sealing member 180 for sealing engagement with the lower surface 150 of the T-element 133. A large central passage 182 extends through the entire length of pipe element 178 and is connected by a threaded aperture 184 formed in the side thereof. A connector member 186, which connects to a pressure line 188 leading to the trailer brake pressure line 34 is threadably received in the aperture 184.

A second pipe member 190, having an outside diameter substantially less than the inside diameter of pipe member 178, extends into the pipe 178 and upwardly through the passage 182 with a land portion 192, adjacent the lower end thereof having an outside diameter substantially the same as the inside diameter of the pipe member 178, for sealing engagement therewith. A head portion 194 integrally formed with the land portion 192 extends downwardly therefrom and provides an externally threaded portion 196 for receipt of a clamping member 198 to rotatably secure a ball portion 200 of the piston 60, as will be explained. A connector member 202, threadably received in the side of the head portion 194, connects a flow passage 204 which extends upwardly and concentrically through the pipe member 190. A pressure line 206, connected to the connector member 202 at one end, is connected to pressure line 66 which returns to the tractor pressure source.

The upper or inner end of the pipe member 190 provides a threaded portion 208 which is threadably received in one side of a spider member 210. The spider member 210 is rotatably received in the central passage 182 of pipe member 178 and provides a plurality of passages 212 therethrough about the periphery thereon to permit the flow of fluid from the line 34 to the line 38 on the king pin 12.

A tip member 214 is threadably received in the other side of the spider 210 and extends in an upwardly direction to an elevation substantially the same as the end surface of pipe member 178. A conical seal member 216, preferably formed from a resilient material such as neoprene rubber, is secured to the upper portion of the tip member 214 and provides a mating surface for sealing engagement with the converging side walls 146 of the T-shaped element 133. The tip member 214 provides an enlarged passage 218, centrally formed therein, having a diameter equal to the diameter of passage 204 in pipe member 178, which reduces in diameter as indicated by the numeral 220.

Thus it is seen from the above detailed description and readily viewed in FIG. 2, when the insert member 14 is connected to the kingpin 12 there is provided a continuous flow passage from the line 34 to line 38 and from line 66 to line 68 which interconnects the hydraulic equipment on the tractor with the hydraulic components on the trailer.

Still referring to FIG. 2, the kingpin 12, secured to a trailer, provides a flat slide plate 222 (shown in broken lines) for sliding engagement with a fifth wheel on the tractor, a portion thereof is indicated by the numeral 224 and similarly shown in broken lines.

A ribbed frame 226 is secured in spaced relationship to the under surface of the fifth wheel by equally spaced apart bolt members 228 (only one being shown in the drawings) and provides a double nut locking arrangement 230 to permit axial or vertical adjustment of the frame 226 relative to the fifth wheel.

A contoured bell shaped housing 232 is integrally formed on the ribbed frame 226 and extended downwardly therefrom to provide protection and serve as a guide for the reciprocating insert member 14. A plate 234 is secured over a lower open portion 235 of the housing 232 by a plurality of bolts 236 engaging the periphery thereof. The piston 60, previously explained relative to FIG. 1, is centrally mounted on the plate 234 with a plunger rod 238 thereof extending therethrough and terminating in the ball 200 secured to the head portion 194 of pipe member 190, as previously explained.

The enlarged lower open portion 235 permits the pressure lines 188 and 206 to flex and coil therein as the piston 60 reciprocates the insert member 14. An upper portion 240, which provides a straight passageway through the rib member 226, resiliently receives the reciprocating insert member 14. A plurality of U shaped spring members 242 have one end thereof secured to the side of the head portion 194 by screw members 193, with the other ends having a rounded tip 244 secured thereto and in bearing relationship against the side walls of the upper portion 240. By equally spacing the spring members about the head portion 190, the entire insert member 14 will be resiliently retained in concentric relationship with the opening in the fifth wheel in which the kingpin is received. In addition, the rounded tips 244 make only point contact with the side walls of the upper portion 240 requiring less force to reciprocate the insert member 14 since there is little frictional force to overcome.

A suitable electrical connector 246 may be secured to the plate 234 to which the lead wires from connectors 170 are connected for mating contact with the wiring of the tractor.

Having described in detail the structural characteristics and geometrical relationship of the component parts of the two main elements, the kingpin 12 and insert member 14, of the automatic coupling mechanism of this invention, it is readily apparent to those skilled in the art that as the trailer is pivotally secured for movement thereof as a combination, the necessary fluid and electrical service lines are automatically connected. It is further obvious that the coupling mechanism of this invention may be readily installed on existing tractors and trailers with little structural change and requiring a minimum of effort and cost.

It is realized that the actual details of the construction and arrangement of the several component parts may be readily modified by one skilled in the art, and the inventors only intend to be limited to a reasonable interpretation of the appended claims covering the construction as illustrated and described.

What is claimed is:

1. A coupling mechanism for securing a tractor to a trailer and automatically connecting power service lines therebetween comprising a kingpin rigidly secured to the trailer, a fifth wheel pivotally secured to the tractor for receipt of said kingpin, an insert member reciprocably mounted beneath said fifth wheel, said insert member disposed in alignment with said kingpin when said kingpin is received in said fifth wheel, a retractible cover plate disposed over said insert member when disengaged from said kingpin, a first fluid pressure actuated piston secured to said cover plate to effect upper terminal movement thereof for removal of said retractible cover from over said insert member, a plurality of tractor service lines connected to said insert member extending through said insert member including a conduit connected to a source of air under constant pressure on the tractor and to said first piston, a plurality of trailer service lines connected to said kingpin, a second fluid pressure actuated piston secured to said insert to effect reciprocation thereof to engage and disengage said insert member with said kingpin in sealing relationship to interconnect the service lines from the tractor to the trailer, and valve means in said conduit actuated by said piston for admitting air from said conduit to actuate said second piston to engage said insert member with said kingpin.

2. In combination with a coupling mechanism for pivotally securing a tractor to a trailer and automatically connecting the power service lines on the tractor to the power service lines on the trailer, a kingpin comprising a collector ring releasably recessed in the bottom wall of the kingpin, electrical contacts disposed in said collector ring, passages extending through said kingpin for receipt of electrical service lines from said trailer, a fluid flow passage centrally formed through said kingpin and said collector ring, said flow passage connecting at its upper end with fluid service lines on said trailer and a first seal member disposed about the lower end of said fluid flow passage for sealing contact between said collector ring and the kingpin and a second seal member disposed on the kingpin for sealing contact with a mating insert member to provide a continuous fluid flow passage and electrical passage from the tractor to the trailer.

3. In combination with a coupling mechanism for pivotally securing a tractor to a trailer and automatically connecting the power service lines on the tractor to the power service lines on the trailer, a kingpin comprising a collector ring releasably recessed in the bottom surface of the kingpin, a plurality of electrical contacts disposed in equally spaced concentric circles in said collector ring, a plurality of passages extending through said kingpin for receipt of electrical service lines from said trailer, each of said service lines connected to one of said contacts, a pair of fluid flow passages centrally formed through said kingpin and said collector ring, each of said flow passages connecting at one end with fluid service lines on said trailer and a first seal member disposed about the other end of said fluid flow passages and a second seal member disposed adjacent the periphery of the bottom wall of the kingpin for sealing contact with a mating insert member to provide a continuous fluid flow passage and electrical passage from the tractor to the trailer.

4. The combination called for in claim 3 wherein said pair of fluid flow passages are concentrically formed one inside of the other with the inner flow passage providing converging inner side walls adjacent one end for sealing engagement with a mating insert member.

5. In combination with a coupling mechanism for pivotally securing a tractor to a trailer and automatically connecting the power service lines on the tractor to the power service lines on the trailer, an insert member disposed on the tractor in alignment for mating engagement with a kingpin on the trailer comprising a cylindrical housing, an electrical insulating block disposed in one end of said housing, a plurality of electrical contacts disposed in said block, bias means received in said block urging said contacts upwardly, an opening through said housing for receipt of electrical service lines on said tractor, each of said electrical service lines connected to one of said electrical contacts, a pair of fluid flow passages extending through said housing and said block, one end of said fluid flow passages connecting with fluid service lines on the tractor and a seal member disposed about the other end of said fluid flow passage for sealing contact with the kingpin on the trailer.

6. In combination with a coupling mechanism for pivotally securing a tractor to a trailer and automatically connecting the power service lines on the tractor to the power service lines on the trailer, an insert member disposed on the tractor in alignment for mating engagement with a kingpin on the trailer comprising a cylindrical housing, an electrical insulating block disposed in one end of said housing, a plurality of electrical contacts disposed in said block, spring members received in said block urging said contacts upwardly, an opening through said housing for receipt of electrical service lines on said tractor, each of said electrical service lines connected to one of said electrical contacts, a pair of fluid flow passages concentrically mounted one inside the other extending through said housing and said block, one end of said fluid flow passages connecting with fluid service lines on the tractor, a first seal member disposed about the other end of the inner fluid flow passage and a second seal member disposed about the other end of the outer fluid flow passage for sealing contact with the kingpin on the trailer.

7. In a tractor-trailer coupling mechanism, an automatic control system operated from within the cab of the tractor for connecting the power service lines on the tractor to the power service lines on the trailer comprising a kingpin secured to the trailer, a fifth wheel secured to the tractor, an insert member reciprocably disposed beneath the fifth wheel in alignment for mating engagement with the kingpin when received in the fifth wheel, a fluid actuated piston connected to said insert member to effect engagement or disengagement of said insert member with said kingpin, a control valve mounted within the tractor cab and connected to one side of said piston to actuate the piston to disengage said insert member and kingpin, constant pressure supply connector means connected to the other side of said piston for actuating the piston to engage said insert member and kingpin, and a fluid flow delay valve connected with said other side of said piston and opening upon mating engagement of said insert member with said kingpin by said piston to permit passage of fluid through said insert member to the trailer.

8. In a tractor-trailer coupling mechanism, an automatic control system operated from within the cab of the tractor for connecting the power service lines on the tractor to the power service lines on the trailer comprising a kingpin secured to the trailer, a fifth wheel secured to the tractor, an insert member reciprocably disposed beneath the fifth wheel in alignment for mating engagement with the kingpin when received in the fifth wheel, a constant pressure connection means carried by the tractor, a retractible cover member disposed over said insert member, a first piston connected to said cover member and actuated by said constant pressure means for retracting said cover member, a second piston connected to said insert member to effect engagement and disengagement of said insert member with said kingpin, a control valve actuated by said first piston upon retraction of said cover member for actuating said second piston to engage said insert member and kingpin, and a fluid flow delay valve connected to said second piston and actuated upon mating engagement of said insert member with said kingpin to permit fluid to flow from said constant pressure means through the insert member and kingpin to the trailer service lines.

9. In a tractor-trailer coupling mechanism, an automatic control system for connecting the electrical and fluid power service lines on the tractor to the electrical and fluid power service lines on the trailer comprising a kingpin secured to the trailer, a fifth wheel secured to the tractor, an insert member reciprocally disposed beneath the fifth wheel in alignment for mating engagement with the kingpin when received in the fifth wheel including a cylindrical housing, an electrical insulating block fixedly secured within the housing, a plurality of electrical contacts connected to the electrical power lines on the tractor resiliently retained in an upper planar surface of said block, a pair of flow passages extending through the housing and block connected to the fluid power lines on the tractor, a control valve mounted within the tractor cab, a power piston controlled by said control valve to effect engagement and disengagement of said insert member with the kingpin and a fluid flow delay valve interconnected with and actuated in conjunction with said piston upon mating engagement of said insert member with said kingpin to permit fluid flow from the tractor fluid service lines through the insert member and kingpin to the trailer service lines.

10. A coupling mechanism for pivotally securing a tractor to a trailer and automatically connecting the electrical and fluid power service lines therebetween comprising a kingpin secured to the trailer having a collector-ring releasably recessed in the lower surface thereof, first electrical contacts disposed in equally spaced concentric circles in said collector ring connected to the electrical service lines on the trailer, a pair of first fluid flow passages concentrically formed through the collector ring and the kingpin connected to the fluid service lines on said trailer, resilient seal members disposed in said kingpin about said fluid flow passages; an insert member reciprocally retained in a fifth wheel mounted on the tractor including a cylindrical housing, an electrical insulating block secured in said housing, second electrical contacts resiliently mounted in said block and connected to the electrical service lines on the tractor, a pair of second fluid flow passages formed through the block and said housing connected to the fluid power service lines on the tractor; and a fluid pressure power piston actuated from the tractor to sealingly engage said insert member with said kingpin to provide a continuous fluid and electrical flow path from the tractor power service lines to the trailer power service lines.

11. In a tractor-trailer coupling mechanism, an automatic control system operated from within the cab of the tractor for connecting the power service lines on the tractor to the power service lines on the trailer comprising a kingpin secured to the trailer, a fifth wheel secured to the tractor, an insert member reciprocally disposed beneath the fifth wheel in alignment for mating engagement with the kingpin when received in the fifth wheel, conduit means for fluid under pressure connected to the insert member, a cover member disposed over said insert member, a first piston connected to said cover member, means for actuating said piston from the tractor including a connection to said conduit means and said first piston, the application of air pressure to said conduit means, a second piston connected to said insert member to effect engagement and disengagement of said insert member with said kingpin, a first fluid flow delay valve interconnected with and actuated by said first piston to effect operation of said second piston and a second fluid flow delay valve connected with and actuated from said second piston upon mating engagement of said insert member with said kingpin to permit fluid flow from the tractor fluid service lines through the insert member and kingpin to the trailer service lines.

12. The combination called for in claim 11 including a control valve mounted within the tractor cab and means controlled thereby for actuating said second piston to disengage said insert member and kingpin and the first piston to return the cover member over the insert member.

13. In a tractor-trailer coupling mechanism, an automatic control system operated from the tractor for connecting the power service lines on the tractor to the power service lines on the trailer comprising a kingpin secured to the trailer, a fifth wheel secured to the tractor including a latch engaging the kingpin, an insert member reciprocably disposed beneath the fifth wheel in alignment for mating engagement with the kingpin when same is in latched position, a constant pressure connection means carried by the tractor, a retractible cover member disposed over said insert member, second piston means connected to said cover member and actuated on one side by said constant pressure means for retracting said cover member and on the other side by said controlled valve for returning the cover member, third piston means connected to said insert member to effect engagement and disengagement of said insert member with said kingpin, a control valve actuated by said second piston means upon retraction of said cover member for actuating said third piston to engage said insert member and kingpin, and a fluid flow valve connected to said third piston means and actuated upon mating engagement of said insert member with said kingpin to permit fluid to flow from said constant pressure means through the insert member and kingpin to the trailer service lines.

References Cited by the Examiner

UNITED STATES PATENTS

| 1,926,264 | 9/33 | Connors | 280—422 |
|---|---|---|---|
| 2,053,614 | 9/36 | Johnson et al. | 280—421 |
| 2,457,478 | 12/48 | Letvin | 280—421 |
| 2,859,980 | 11/58 | Holland | 280—421 |
| 2,924,464 | 2/60 | Zajac | 280—421 |

FOREIGN PATENTS 464,077   4/37   Great Britain.

A. HARRY LEVY, *Primary Examiner.*

LEO FRIAGLIA, PHILIP ARNOLD, *Examiners.*